Figure 1:
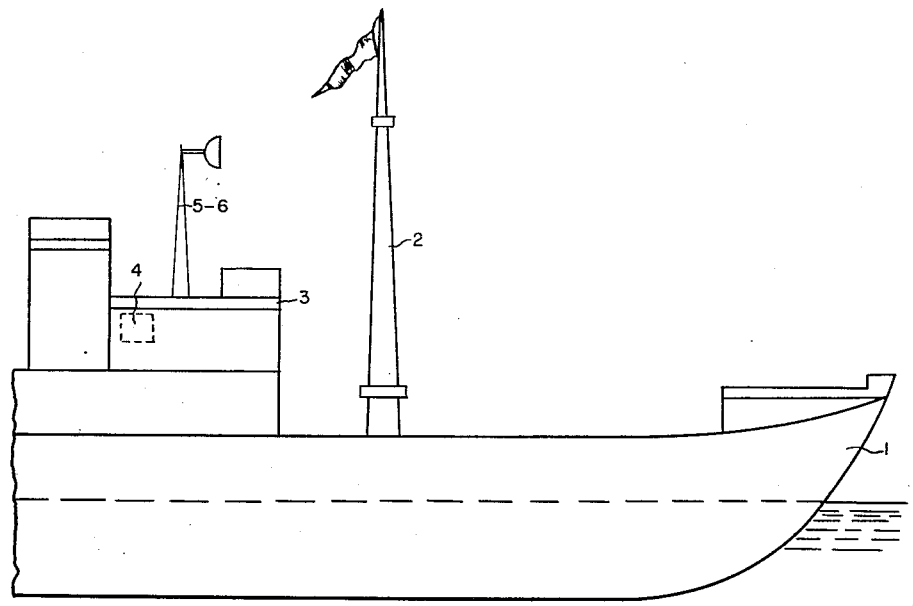

Sept. 29, 1953     H. DE LANGE     2,654,083
RADAR EQUIPMENT
Filed July 1, 1949

INVENTOR
HENDRIK DE LANGE
BY
AGENT

Patented Sept. 29, 1953

2,654,083

UNITED STATES PATENT OFFICE 2,654,083

RADAR EQUIPMENT

Hendrik de Lange, Dz., Eindhoven, Netherlands, assignor to Hartford National Bank and Trust Company, Hartford, Conn., as trustee Application July 1, 1949, Serial No. 102,486
In the Netherlands July 6, 1948

3 Claims. (Cl. 343—5)

1

This invention relates to radar equipment in which the surroundings are scanned by means of waves transmitted according to a moving radius vector, the received signals providing an indication about the position of reflecting objects on a position indicator.

Such radar equipment in which radio waves are transmitted at a wavelength of, for example, from 3 to 10 cms. are known per se, and are used more particularly for the navigation of ships in which use is frequently made of a plan position indicator.

For transmitting waves according to a moving radius vector, it is known to utilise dipole aerials arranged in a parabolic reflector rotating about a vertical axis. As an alternative, a beam scanning the surroundings may be obtained by utilising an immovably-arranged aerial system comprising a plurality of dipoles which are fed by way of phase-shifting networks producing different frequency-dependent phase-shifts with the use of a varying transmitting frequency. It is furthermore possible, in the case of constant transmitting frequency, to vary the phase-shifts produced by the various networks for the purpose of varying the direction of transmission.

It is known, for example with radar equipment of ships, that obstacles such, for example, as the foremast of a ship, located within the solid angle to be scanned in front of the aerial system, may produce disturbing sector-like shadows on the position indicator, so that objects such, for example, as buoys and vessels coming from the opposite direction which are located in this shadow are not perceptible.

It has previously been suggested that the aerial system of the radar equipment should be arranged at a level such that disturbing shadow formation produced, for example, by the foremast cannot occur. However, such an arrangement of the aerial system frequently involves practical disadvantages.

The object of the invention is to provide a particularly simple solution in order to avoid the said disadvantage.

According to the invention, in radar equipments of the type described, use is made of an aerial system comprising two aerials electrically connected in parallel and arranged individually, the two aerials exhibiting directional characteristics equally directed and moving isochronously.

The aerials may be constituted, for example, by two directional aerials moved isochronously about vertical axes, one aerial being arranged at the starboard side and the other at the port side on

2 the bridge of a vessel. An advantageous basal distance for the two aerials is, for example 10 metres.

Figure 2:
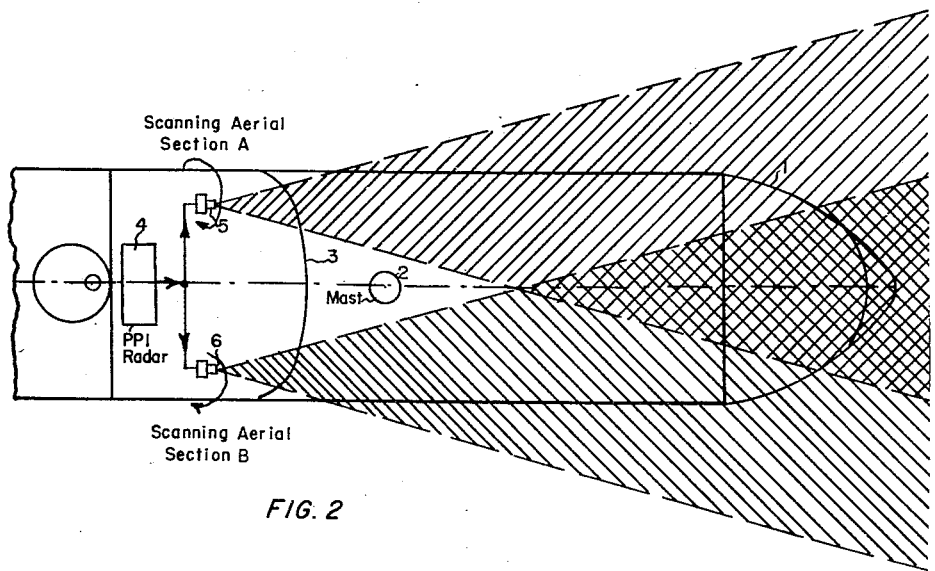

For a better understanding of the invention, reference is had to the following detailed description to be read in connection with the accompanying drawing wherein:

Fig. 1 is an elevational view of a portion of a vessel provided with a radar installation in accordance with the invention; and Fig. 2 is a plan view of said vessel. Referring now to the figures, on the body of the ship 1 there is arranged on a point along the center line a foremast 2 and disposed behind said mast is a navigating bridge 3. Mounted on the bridge is a radar installation 4 including a pair of scanning antennas 5 and 6 disposed on either side of the center line of the ship. The radar installation, save for the antennas, may be of conventional design and comprises a pulse transmitter and echo receiver coupled in common to both antennas.

The use of two separate aerials according to the invention permits of avoiding a troublesome shadow effect produced, for example, by the foremast of the ship, at least insofar as perceptible objects which are not located at a very small distance from the radar equipment are concerned.

In electrical respect the aerials are connected to act in parallel so that the definition of the indicator image for objects located at a comparatively small distance, for example from 100 to 200 metres from the aerial system, decreases. The decrease in definition becomes smaller as the distance of the perceptible objects increases and is negligible at distances from 1 to 2 kms. so that in practice, also on account of the simplicity of the solution provided, the advantages largely counterbalance the disadvantages.

What I claim is:

1. In a plan position indicating radar installation adapted for operation adjacent a ship's foremast or other nearby obstruction in the scanning angle of the installation and provided with a radar transmitter; an antenna system comprising two like aerial sections disposed in spaced relation and oriented relative to each other to produce two beams projecting in substantially the same direction, which beams overlap except in the area of said obstruction, means fixedly electrically interconnecting said sections and coupling said interconnected sections to a common transmission line leading to said transmitter, and means rotating said sections isochronously through equal angles whereby one of said beams will always clear said obstruction whenever the other of said beams interrupts said obstruction.

2. An antenna system, as set forth in claim 1, wherein said aerial sections are rotatable about vertical axes.

3. An antenna system, as set forth in claim 1, wherein said aerial sections are spaced by a basal distance of about 10 metres.

HENDRIK DE LANGE, Dz.

References Cited in the file of this patent

UNITED STATES PATENTS

| Number | Name | Date |
|---|---|---|
| 2,409,462 | Zworykin | Oct. 15, 1946 |
| 2,420,334 | White | May 13, 1947 |
| 2,463,476 | Busignies | Mar. 1, 1949 |
| 2,468,090 | Lundburg | Apr. 26, 1949 |
| 2,480,829 | Barrow | Sept. 6, 1949 |
| 2,523,398 | Southworth | Sept. 26, 1950 |
| 2,540,121 | Jenks | Feb. 6, 1951 |

FOREIGN PATENTS

| Number | Country | Date |
|---|---|---|
| 837,239 | France | Feb. 6, 1939 |